United States Patent [19]

Mims

[11] 4,047,657

[45] Sept. 13, 1977

[54] METHOD AND APPARATUS FOR JOINING METAL WORKPIECES USING HIGH FREQUENCY VIBRATORY ENERGY

[75] Inventor: Bruce L. Mims, Sherman, Conn.

[73] Assignee: Branson Ultrasonics Corporation, New Canaan, Conn.

[21] Appl. No.: 737,526

[22] Filed: Nov. 1, 1976

[51] Int. Cl.² .................................................. B23K 21/02
[52] U.S. Cl. ................................ 228/103; 228/1 R; 228/8; 228/110
[58] Field of Search .................... 228/1 R, 8, 103, 110

[56] References Cited

U.S. PATENT DOCUMENTS

| 3,212,695 | 10/1965 | MacGregor | 228/110 X |
| 3,458,921 | 8/1969 | Christensen | 228/110 X |
| 3,827,619 | 8/1974 | Cusich et al. | 228/110 X |

Primary Examiner—Al Lawrence Smith
Assistant Examiner—K. J. Ramsey
Attorney, Agent, or Firm—Ervin B. Steinberg; Philip J. Feig

[57] ABSTRACT

A method and apparatus for joining metal workpieces using high frequency vibratory energy includes applying short bursts of high frequency energy to the workpieces to be joined and the constant monitoring of the power supplied during the applied bursts of energy. Responsive to the power exceeding a predetermined level, high frequency vibratory energy is applied to the workpieces for a predetermined time interval for creating welds exhibiting consistent quality.

16 Claims, 2 Drawing Figures

METHOD AND APPARATUS FOR JOINING METAL WORKPIECES USING HIGH FREQUENCY VIBRATORY ENERGY

SUMMARY OF THE INVENTION

This invention relates to a method and apparatus for joining metallic workpieces using high frequency vibratory energy and more specifically refers to a welding apparatus which cyclically provides short bursts of high frequency vibratory energy to the workpieces to be joined and monitors the peak power of the applied bursts of energy. Quite specifically, this invention concerns a high frequency welding apparatus which provides short bursts of power and responsive to the peak power delivered to a workpiece exceeding a predetermined level causes such energy to be delivered for a predetermined longer period of time.

U.S. Pat. Nos. 2,946,119 and 2,946,120 disclose the method and apparatus for welding workpieces by means of high frequency vibratory energy. Specifically, these patents disclose the welding of metal workpieces utilizing sonic or ultrasonic vibrations, the weld achieved being in the form of a non-fusion, molecular bond. The method and apparatus to accomplish the joining of metal workpieces by means of this method comprises means for holding the workpieces to be joined in intimate contact under a static force and applying to one of the workpieces vibratory energy in a direction substantially perpendicular to the direction of the applied force. The vibratory energy causes one workpiece to undergo relative translating motion with respect to the other workpiece, creating a molecular bond which joins the workpieces.

As used in this description, the term "high frequency" or "ultrasonic frequency" refers to a frequency in the range between one and 100 kilohertz.

Vibratory welding of metallic workpieces depends upon two stages of operation. In the first stage, a rubbing action between the workpieces is created for cleaning the juxtaposed surfaces of the workpieces to be joined. During the second stage, the cleaned surfaces undergo a molecular interchange for creating a non-fusion bond of the workpieces. Usually, the welding apparatus is adjusted for providing vibratory energy for a predetermined time interval. During an initial portion of the interval the rubbing action cleans the contacting workpiece surfaces and during the remainder of the time interval a molecular interchange occurs. Upon cessation of the vibratory energy, the workpieces are joined.

In many instances, an oxide film is present on the workpiece surface or alternatively insulation (such as enamel), paint, liquid or other contaminant adheres to the workpiece surface which degrade the quality of the weld. Generally, no difficulty is encountered when only a thin layer of a surface contaminant is present which requires only a small initial portion of the total weld interval for removal and hence, a special provision to adjust the overall weld time interval is unnecessary.

In other instances however, a thick surface contaminant condition may be manifest, as when enamel coated wire is to be joined to a workpiece, which condition results in a substantial portion of the total weld time interval being used for cleaning the surface and, hence, necessitating an adjustment of the total weld time. Moreover, due to generally large contaminant layer thickness variations along the workpiece surface it is difficult to accurately and consistently control the two portions of the welding process. Using a fixed time interval compensation adjustment causes one joint to receive insufficient vibratory energy resulting in a weak joint, whereas a subsequent joint may be destroyed by the application of excessive energy.

Various attempts have been made to monitor and control the amount of vibratory energy supplied to a workpiece in an effort to provide welds having consistent quality. For example, in U.S. Pat. No. 3,573,781 to A. Shoh, issued Apr. 6, 1971, entitled "Monitoring Circuit for Sonic Apparatus" an apparatus for monitoring the energy supplied to the welding apparatus is described. While the circuit has met with success in providing welds of generally consistent quality, it has not provided a consistency of weld quality manifesting minimal deviations, as required in certain applications. The present invention provides an improved arrangement of power monitoring for minimizing variation of weld consistencies.

Tests have shown that the power supplied to the welding apparatus for cleaning the workpiece surfaces is significantly less than the power supplied to create molecular interchange at the same workpiece surfaces. In accordance with the teachings of the present invention, the power supplied to the welding apparatus is monitored for determining the precise moment at which the molecular interchange commences. Application of vibratory energy to the workpieces for a predetermined time interval or application of a predetermined quantity of vibratory energy during such molecular interchange stage of the weld cycle assures welds exhibiting consistent weld quality.

In the present invention during the initial stage of the weld cycle when the workpiece surfaces are being cleaned, short cyclical bursts of high frequency energy are conducted from an electrical generator to the welding apparatus. The power during each burst is constantly monitored by a fast-response time wattmeter and compared to a predetermined level. When the power during any burst exceeds the predetermined level indicative of the commencement of the molecular interchange, a signal to the generator causes the bursts to cease and the vibratory energy is applied for the predetermined duration of the second stage of the weld cycle. Alternatively, upon receipt of the signal, a predetermined quantity of additional bursts of energy is applied to the workpieces. The predetermined level is selected so that the energy necessary for removing surface contaminants does not exceed the level, whereas the energy required for causing a molecular interchange does exceed the level. Once a signal indicative of the start of a molecular interchange between the workpieces is manifest at the output of a comparator circuit, the actual duration of such molecular interchange phase is accurately controlled. The application of vibratory energy to the workpieces for substantially identical time intervals during the welding phase of each weld cycle assures consistent weld quality.

Instead of applying vibratory energy for a fixed time interval or for a predetermined quantity of additional bursts during the molecular interchange stage of the weld process, the vibratory energy can be applied to provide a predetermined amount of energy to the weld area. Apparatus for controlling the energy applied to a weld are well-known in the art, see for instance, U.S. Pat. No. 2,917,691.

The necessity for controlling the power applied to a welding apparatus becomes more clearly apparent when the surface contaminant to be removed is the frequently encountered oxide layer. For example, when joining copper workpieces having a heavy oxide layer, high motional amplitude is required to clean the surface. During the course of welding the copper heats up, thereby accelerating the rate of oxide reformation. One method of overcoming the problem is to apply the vibratory energy in short bursts for removing the oxide layer and preventing the workpiece surface from being heated to the point at which the oxide layer reforms.

One principal object of the present invention is therefore, the provision of a method and apparatus for joining metallic workpieces by applying short cyclical bursts of high frequency vibratory energy until the peak power applied during a burst exceeds a predetermined level at which time the energy is applied for a further predetermined time interval.

Another object of the invention is the provision of a method and apparatus for welding metallic workpieces by applying high frequency vibratory energy, the initiation of the weld cycle being responsive to the occurrence of a predetermined power level.

A further object of the invention is the provision of a method and apparatus for joining workpieces by first applying short cyclic bursts of high frequency vibratory energy for cleaning the contacting workpiece surfaces and subsequently applying a predetermined quantity of high frequency vibratory energy for effecting the joining of the workpieces.

A still further object of the invention is the provision of a method and apparatus for joining metallic workpieces by applying short cyclical bursts of high frequency vibratory energy until the peak power applied during a burst exceeds a predetermined level at which time a predetermined number of additional bursts of energy is applied to the workpieces.

Further and still other objects of the invention will become more clearly apparent when the specification is read in conjunction with the accompanying drawings.

DETAILED DESCRIPTION OF THE INVENTION

Figure 1:
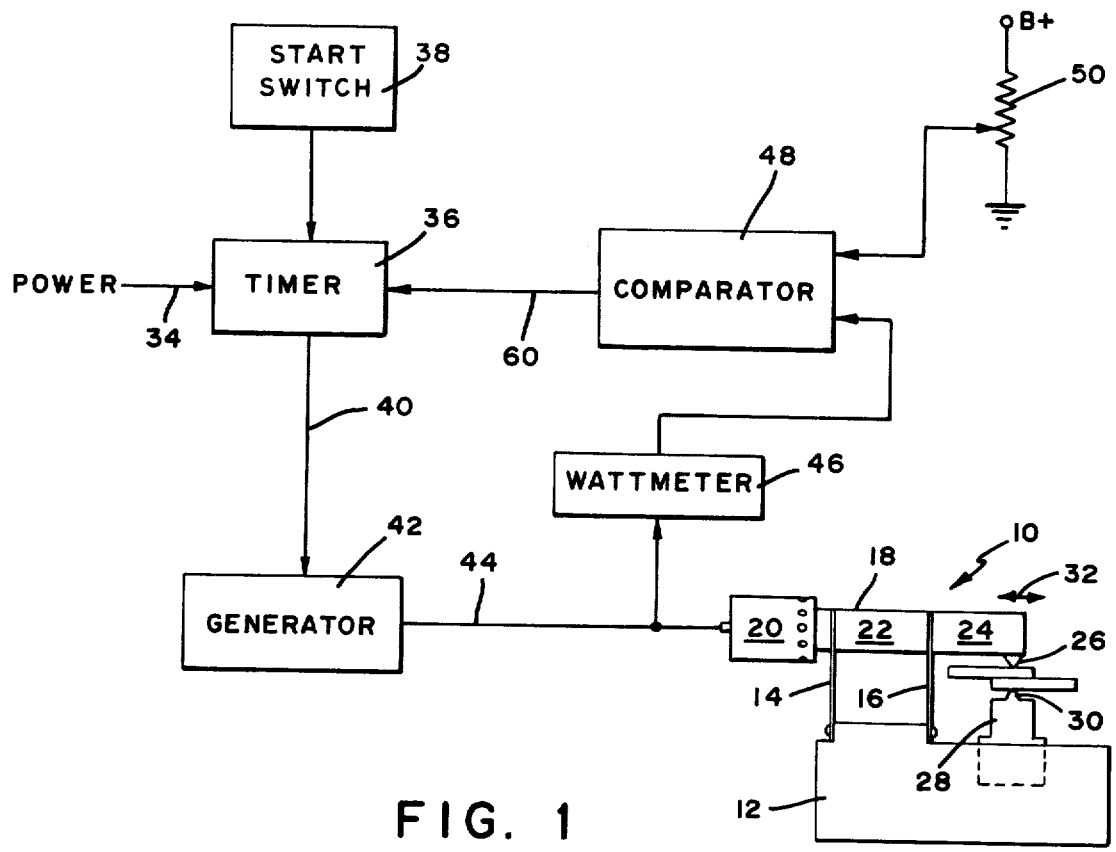
FIG. 1 is a schematic block diagram of a preferred embodiment of the invention.

Referring now to the figures and FIG. 1 in particular, a high frequency vibratory welder 10 for joining metal workpieces is shown. The welder comprises a base 12 having two upstanding support members 14 and 16 for supporting a resonator assembly 18 at antinodal regions thereof. The resonator assembly 18 includes a converter 20, an intermediate coupling member 22 and a horn 24 all of which are dimensioned to operate as a half wavelength resonator at a predetermined frequency of vibration. The resonant frequency is typically in the range between one and 100 kHz, and preferably is between 10 kHz and 60 kHz. Radially extending from the horn 24 is a workpiece engaging tip 26 and upstanding from the base 12 is a fluid actuated piston 28 having a corresponding workpiece engaging anvil portion 30. The construction and operation of the welder 10 is described in detail in U.S. Pat. No. 3,752,380, to A. Shoh, issued Aug. 14, 1973, entitled "Vibratory Welding Apparatus", which patent is incorporated herein by reference. Moreover, a converter suitable for use in the present apparatus is described, for instance, in U.S. Pat. No. 3,328,610, entitled "Sonic Wave Generator" issued to S. E. Jacke et al., dated June 27, 1967. The converter 20 is driven by an electrical generator 42 in a manner to provide constant motional amplitude at its tip 26 as disclosed in U.S. Pat. No. 3,432,691 issued to A. Shoh, dated Mar. 11, 1969, entitled "Oscillatory Circuit for Electroacoustic Converter".

Conventional line power is provided along conductor 34 to a timer 36. Responsive to actuation of start switch 38, timer 36 causes short bursts of line power to be manifest along conductor 40 to electrical generator 42. The generator 42 transforms the line power into high frequency, high voltage signals for energizing the converter 20. Typically, the bursts have a duration in the order of up to one second but preferably are in the range from 50 milliseconds to 200 milliseconds. Each burst is spaced from a succeeding burst by a comparable length of time. The pulse duration and spacing between pulses preferably are independently adjusted according to the workpieces to be joined.

The electrical energy signal from generator 42 along conductor 44 to converter 20 is monitored by a fast response time wattmeter 46. The monitored signal, indicative of the power supplied to the welder 10, is provided at one input of comparator 48. The other input of comparator 48 is provided with a predetermined voltage level signal coupled from the wiper of a potentiometer 50, the ends of which are connected to a direct current power supply B+ and ground potential, respectively.

When the monitored signal exceeds the predetermined level, a signal from comparator 48, manifest along conductor 60 to the timer 36 causes the timer to provide the power signal along conductor 40 for a predetermined length of time instead of in short bursts.

Alternatively, in a modification of the described apparatus, a counter circuit is initiated responsive to an output signal from comparator 48 for counting a predetermined number of additional bursts of energy provided by the timer 36 to generator 42 during the weld cycle. A further alternative embodiment comprises the activation of an energy control device as shown in U.S. Pat. No. 3,573,781 supra responsive to the output signal from the comparator 48.

OPERATION

Figure 2:
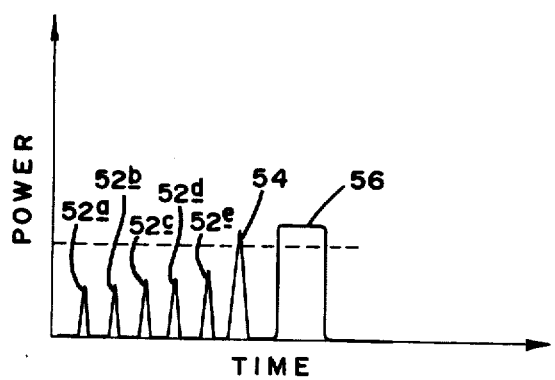
FIG. 2 is a graphical representation of the power supplied to a welding apparatus in accordance with the present invention.

Workpieces to be joined are disposed in overlapping relationship on anvil 30. Cylinder 28 responsive to fluid pressure urges the overlapped workpieces into forced intimate contact with workpiece engaging tip 26. Upon actuation of start switch 38, periodic bursts of line power are provided along conductor 40 to generator 42. The generator 42 transforms the line power into high frequency, high voltage signals as shown by bursts 52a to 52e in FIG. 2. The bursts of energy are transmitted to converter 20 which converts the signals into vibratory motion. The workpiece engaging tip 26, contacting the uppermost workpiece, undergoes reciprocating translating motion in the direction of double headed arrow 32. The peak-to-peak displacement of the tip 26 is in the range between 3 to 10 mils (0.075 to 0.25mm). Due to the motion of the tip 26, the workpieces undergo relative reciprocating translating motion causing a rubbing action along their contacting surfaces thereby displacing the respective surface contaminants. In the case of metallic workpieces, the frictional heating of the workpieces on the one hand, cleans the surface but also encourages the formation of oxides. Application of short bursts of vibratory energy in accordance with the present invention prevents excessive heating of the workpieces at the interface, thereby allowing for a cleaning action with minimal oxide reformation.

Tests have shown that when insufficient energy or energy applied for too short a period is used to join workpieces there is an absence of molecular interchange at the interface and a weld of poor quality is achieved. Moreover when excessive energy or weld time is apparent, the workpieces joined are damaged due to over welding. During an initial stage, the workpieces require a relatively low amount of power for cleaning the surfaces. After the surfaces are cleaned, a sudden and marked increase in power occurs during which time molecular interchange along the interface is occurring, i.e., the workpieces are being joined.

In accordance with the invention, the wattmeter 46 monitors the power to the converter 20. Upon the occurrence of a sudden increase of power as illustrated by pulse 54 (FIG. 2), a signal is provided along conductor 60 to activate time 36 for a predetermined weld time interval 56 as adjusted by the timer 36 or for a predetermined number of additional bursts of energy. Adjustment of potentiometer 50 varies the power level necessary to initiate the weld cycle, trace 56.

It will be apparent however, that proper potentiometer 50 adjustment is essential for optimum operation of the welder. For instance, when the predetermined level is adjusted to a low value, premature weld cycle initiation will occur and the resulting weld is of the type exhibiting an absence of molecular interchange. Conversely, a predetermined level that is too high will result in overheating of the workpiece causing a weld damaging the workpiece. Optimally the potentiometer 50 is adjusted for providing short bursts of energy during the time required to clean interface surface contaminants and for providing prolonged power during the time required for the molecular interchange between the workpieces. Proper adjustment of potentiometer 50 and monitoring of the power to converter 20 result in an improved method of maintaining joined workpieces having uniform weld characteristics. In order to find the proper potentiometer adjustment, test specimens are prepared and evaluated by visual inspection as well as by subjecting them to tensile and shear strength prior to commencing a production run.

While in the above description a preferred embodiment of the invention has been described and illustrated it will be apparent to those skilled in the art that certain changes and modifications may be made without deviating from the broad principle and spirit of the invention, which shall be limited only by the scope of the appended claims.

What is claimed is:

1. The process of welding workpieces having metal surfaces by high frequency vibratory energy comprising:

superposing two workpieces to be welded upon one another;

applying a static force to the workpieces in a direction and of a magnitude to hold the contacting to be welded metal faces of the workpieces in intimate contact at the intended welding zone;

introducing through a vibrating element contacting one of the to be welded workpieces at the weld zone short bursts of vibratory energy having a predetermined frequency in the range from one to one hundred kilohertz;

monitoring the power commensurate with the vibratory energy transferred from the element to the workpieces and determining when a burst reaches a predetermined power amplitude, and responsive to the occurrence of said power reaching the predetermined amplitude introducing said vibratory energy for a predetermined weld cycle.

2. The process of welding as described in claim 1, said vibrations being applied in a direction perpendicular to the direction of the applied static force.

3. An apparatus for welding workpieces having metal surfaces by high frequency vibratory energy comprising:

a resonator dimensioned to be resonate as a half wavelength resonator at a pedetermined frequency of sound travelling therethrough;

a workpiece engaging tip adapted to engage a workpiece disposed at an antinodal region of said resonator;

means disposed for providing a static force for urging workpieces into intimate contact with said tip;

transducing means coupled to said resonator for causing said resonator to be resonant at said predetermined frequency in response to electrical energy applied to said transducing means;

electrical generating means coupled to said transducing means for providing short bursts of electrical energy to said transducing means, and monitoring means coupled in circuit with said electrical generating means for monitoring the power supplied to said transducing means when said tip is engaging a workpiece and causing responsive to the monitored power exceeding a predetrmined level said electrical generating means to provide additional electrical energy to said transducing means to commence a predetermined weld cycle.

4. An apparatus for welding as set forth in claim 3, said tip extending radially for said resonator at an antinodal region thereof.

5. An apparatus for welding as set forth in claim 3, and means coupled to said monitoring means for adjusting said predetermined level.

6. An apparatus for welding as set forth in claim 3, said predetermined frequency being in the range between one and one hundred kilohertz.

7. An apparatus for welding as set forth in claim 3, said bursts having a time duration individually not exceeding one second.

8. An apparatus for welding as set forth in claim 3, said additional electrical energy to said transducing means being electrical energy applied for a predetermined time interval.

9. An apparatus for welding as set forth in claim 3, said additional electrical energy to said transducing means being a predetermined number of bursts of electrical energy.

10. An apparatus for welding metal workpieces by high frequency vibratory energy comprising:

an elongate resonator dimensioned to be resonant as a half wavelength resonator at a predetermined frequency of sound travelling therethrough;

a workpiece engaging tip adapted to engage a workpiece disposed at an antinodal region of said resonator;

means disposed for providing a static force for urging workpieces into intimate contact with said tip;

transducing means coupled to said resonator for causing said resonator to be resonant at said predetermined frequency in response to electrical energy applied to said transducer means;

electrical generating means coupled to transducing means for providing electrical energy to said transducing means responsive to a control signal;

monitoring means coupled in circiut with said generating means for monitoring the power supplied to said transducing means when said tip is engaging a workpiece and providing a power responsive signal, and timer means coupled to said monitoring means for providing the control signal to said electrical generating means to effect when said power responsive signal is less than a predetermined level said generating means to cyclically cause said resonator to be resonant for short bursts of time and to effect when said power responsive signal exceeds said predetermined level said resonator to be resonant for an additional time interval.

11. An apparatus for welding as set forth in claim 10, said tip extending radially from said resonator at an antinodal region thereof.

12. An apparatus for welding as set forth in claim 10, said monitoring means including means for adjusting said predetermined level.

13. An apparatus for welding as set forth in claim 10, and means for adjusting the pulse width of said bursts and further means for adjusting the space between said bursts.

14. An apparatus for welding as set forth in claim 10, said predetermined frequency being in the range between one and one hundred kilohertz.

15. An apparatus for welding as set forth in claim 10, said additional time interval being a predetermined time interval.

16. An apparatus for welding as set forth in claim 10, said additional time interval being the duration of a predetermined number of bursts of energy.

* * * * *